(12) United States Patent
Hubinak et al.

(10) Patent No.: US 8,737,983 B2
(45) Date of Patent: May 27, 2014

(54) METHOD, CONNECTION AND DATA CARRIER TO PERFORM REPEATED OPERATIONS ON THE KEY-BOARD OF MOBILE COMMUNICATION DEVICE

(75) Inventors: Emil Hubinak, Piestany (SK); Miroslav Florek, Bratislava (SK); Michal Masaryk, Bratislava (SK)

(73) Assignee: Logomotion, S.R.O. (SK)

( * ) Notice: Subject to any disclaimer, the term of this patent is extended or adjusted under 35 U.S.C. 154(b) by 802 days.

(21) Appl. No.: 12/808,435

(22) PCT Filed: Mar. 23, 2009

(86) PCT No.: PCT/IB2009/051212
§ 371 (c)(1),
(2), (4) Date: Jun. 16, 2010

(87) PCT Pub. No.: WO2009/118681
PCT Pub. Date: Oct. 1, 2009

(65) Prior Publication Data
US 2010/0323617 A1 Dec. 23, 2010

(30) Foreign Application Priority Data
Mar. 25, 2008 (SK) .................................. 5030-2008

(51) Int. Cl.
*H04M 3/00* (2006.01)
(52) U.S. Cl.
USPC ......... 455/420; 455/41.1; 455/41.2; 455/410; 455/411; 455/418; 455/556.1; 455/556.2; 455/557; 455/558; 340/10.1; 340/10.3; 340/10.4; 340/10.42; 340/10.5; 340/10.52; 340/572.1; 340/5.2; 340/5.4; 340/5.41; 340/13.24; 340/13.26; 235/472.01; 235/472.02
(58) Field of Classification Search
USPC .............. 455/41.1, 41.2, 410, 411, 418–420, 455/557, 558, 556.1, 556.2; 340/572.1, 340/10.1, 10.3, 10.4, 10.42, 10.5, 10.51, 340/10.52, 13.24, 13.25, 13.26, 5.2, 5.4, 340/5.41; 235/472.01, 472.02
See application file for complete search history.

(56) References Cited

U.S. PATENT DOCUMENTS 5,574,470 A 11/1996 de Vall
5,608,417 A 3/1997 de Vall
(Continued)

FOREIGN PATENT DOCUMENTS

CN 1450782 10/2003
CN 1627321 6/2005
(Continued)

OTHER PUBLICATIONS

Madlmayar et al., "Management of Multiple Cards in NFC-Deivces", LNCS, 2008, 21 pages.
(Continued)

*Primary Examiner* — Tuan A Tran
(74) *Attorney, Agent, or Firm* — Baker & Hostetler LLP

(57) ABSTRACT

When processing repeated operations on the keyboard of a mobile communication device, mainly at direct debits, used is a separate data carrier with a memory in which is stored at least one file with a sequence of keyboard orders of a macro type. Data carrier is energetically supplied contact-free by electromagnetic field of the mobile communication device while receiving the requiring order and, according to this order, chooses from the memory and encodes appropriate file with a sequence of keyboard orders. Data carrier sends the encoded file into the mobile communication device which decodes the received file and performs processes representing the keystrokes according to the sequence of keyboard orders. The invention also describes connection and data carrier to perform above described method where the data carrier consists of a processor, transmitting and receiving unit, block for transforming electromagnetic field and a memory to store a file of orders.

16 Claims, 2 Drawing Sheets

(56) References Cited

U.S. PATENT DOCUMENTS

| | | | |
|---|---|---|---|
| 6,062,472 A | 5/2000 | Cheung | |
| 6,070,795 A | 6/2000 | Feiken | |
| 6,070,796 A | 6/2000 | Sirbu | |
| 6,450,407 B1 | 9/2002 | Freeman et al. | |
| 6,615,243 B1 | 9/2003 | Meggeid et al. | |
| 6,745,935 B1 | 6/2004 | Grieu et al. | |
| 6,828,670 B2 | 12/2004 | Hayana et al. | |
| 6,976,011 B1 | 12/2005 | Capitant et al. | |
| 7,200,420 B2* | 4/2007 | Rankin | 455/558 |
| 7,364,092 B2 | 4/2008 | Narendra et al. | |
| 7,374,100 B2 | 5/2008 | Jei et al. | |
| 7,407,107 B2* | 8/2008 | Engestrom et al. | 235/472.01 |
| 7,436,965 B2 | 10/2008 | Sherman | |
| 7,458,518 B2 | 12/2008 | Fukuda et al. | |
| 7,481,358 B2 | 1/2009 | Honjo et al. | |
| 7,568,065 B2 | 7/2009 | D'Athis | |
| 7,581,678 B2 | 9/2009 | Narendra et al. | |
| 7,599,684 B2* | 10/2009 | Kim | 455/418 |
| 7,606,533 B2* | 10/2009 | Perttila et al. | 455/41.2 |
| 7,689,932 B2 | 3/2010 | Maktedar | |
| 7,775,442 B2 | 8/2010 | Saarisalo | |
| 7,775,446 B2 | 8/2010 | Ochi et al. | |
| 7,805,615 B2 | 9/2010 | Narendra et al. | |
| 7,828,214 B2 | 11/2010 | Narendra et al. | |
| 8,055,184 B1 | 11/2011 | DiMartino et al. | |
| 8,127,999 B2 | 3/2012 | Diamond | |
| 8,355,670 B2 | 1/2013 | White | |
| 2001/0001875 A1* | 5/2001 | Hirsch | 713/1 |
| 2001/0005832 A1 | 6/2001 | Cofta | |
| 2002/0147658 A1 | 10/2002 | Kwan | |
| 2002/0163479 A1 | 11/2002 | Lin | |
| 2002/0165008 A1* | 11/2002 | Sashihara et al. | 455/558 |
| 2003/0030542 A1* | 2/2003 | von Hoffmann | 340/5.61 |
| 2003/0138135 A1 | 7/2003 | Chung et al. | |
| 2004/0066278 A1 | 4/2004 | Hughes et al. | |
| 2004/0075675 A1* | 4/2004 | Raivisto et al. | 345/700 |
| 2004/0087339 A1 | 5/2004 | Goldthwaite et al. | |
| 2004/0127256 A1 | 7/2004 | Goldthwaite et al. | |
| 2005/0072595 A1 | 4/2005 | Cho | |
| 2005/0092835 A1 | 5/2005 | Chung et al. | |
| 2005/0116050 A1 | 6/2005 | Jei et al. | |
| 2005/0125745 A1 | 6/2005 | Engestrom | |
| 2005/0269401 A1 | 12/2005 | Spitzer et al. | |
| 2005/0269402 A1 | 12/2005 | Spitzer et al. | |
| 2006/0083955 A1 | 4/2006 | Kanouda et al. | |
| 2006/0143578 A1 | 6/2006 | Maktedar | |
| 2006/0146023 A1 | 7/2006 | Kidron | |
| 2006/0152288 A1 | 7/2006 | Peng et al. | |
| 2006/0186209 A1 | 8/2006 | Narendra et al. | |
| 2006/0219776 A1 | 10/2006 | Finn | |
| 2006/0226217 A1 | 10/2006 | Narendra et al. | |
| 2006/0255160 A1 | 11/2006 | Winkler | |
| 2007/0014407 A1 | 1/2007 | Narendra et al. | |
| 2007/0014408 A1 | 1/2007 | Narendra et al. | |
| 2007/0016957 A1 | 1/2007 | Seaward et al. | |
| 2007/0050871 A1 | 3/2007 | Mashhour | |
| 2007/0083772 A1 | 4/2007 | Harada et al. | |
| 2007/0106564 A1 | 5/2007 | Matotek et al. | |
| 2007/0125840 A1 | 6/2007 | Law et al. | |
| 2007/0152035 A1 | 7/2007 | Adams et al. | |
| 2007/0158438 A1 | 7/2007 | Fukuda et al. | |
| 2007/0171079 A1 | 7/2007 | Saito | |
| 2007/0233615 A1 | 10/2007 | Tumminaro | |
| 2007/0235539 A1 | 10/2007 | Sevanto et al. | |
| 2007/0241180 A1 | 10/2007 | Park et al. | |
| 2007/0278290 A1 | 12/2007 | Messerges et al. | |
| 2007/0293155 A1 | 12/2007 | Liao | |
| 2008/0011833 A1 | 1/2008 | Saarisalo | |
| 2008/0048036 A1 | 2/2008 | Matsumoto et al. | |
| 2008/0051122 A1 | 2/2008 | Fisher | |
| 2008/0059375 A1 | 3/2008 | Abifaker | |
| 2008/0093467 A1 | 4/2008 | Narendra et al. | |
| 2008/0120129 A1 | 5/2008 | Seubert et al. | |
| 2008/0207124 A1 | 8/2008 | Raisanen et al. | |
| 2008/0233906 A1 | 9/2008 | Mitomo et al. | |
| 2008/0250244 A1 | 10/2008 | Baentsch et al. | |
| 2008/0270246 A1 | 10/2008 | Chen | |
| 2008/0306828 A1 | 12/2008 | Chao | |
| 2009/0065571 A1 | 3/2009 | Jain | |
| 2009/0065572 A1 | 3/2009 | Jain | |
| 2009/0069049 A1 | 3/2009 | Jain | |
| 2009/0069050 A1 | 3/2009 | Jain et al. | |
| 2009/0069051 A1 | 3/2009 | Jain et al. | |
| 2009/0069052 A1 | 3/2009 | Jain et al. | |
| 2009/0070272 A1 | 3/2009 | Jain | |
| 2009/0070691 A1 | 3/2009 | Jain | |
| 2009/0070861 A1 | 3/2009 | Jain | |
| 2009/0088077 A1 | 4/2009 | Brown et al. | |
| 2009/0098825 A1 | 4/2009 | Huomo et al. | |
| 2009/0108063 A1 | 4/2009 | Jain et al. | |
| 2009/0119190 A1 | 5/2009 | Realini | |
| 2009/0124273 A1 | 5/2009 | Back | |
| 2009/0143104 A1 | 6/2009 | Loh et al. | |
| 2009/0157936 A1 | 6/2009 | Goss et al. | |
| 2009/0191812 A1 | 7/2009 | Teruyama et al. | |
| 2009/0193491 A1 | 7/2009 | Rao | |
| 2009/0199206 A1 | 8/2009 | Finkenzeller et al. | |
| 2009/0199283 A1 | 8/2009 | Jain | |
| 2009/0200371 A1 | 8/2009 | Kean et al. | |
| 2009/0261172 A1 | 10/2009 | Kumar et al. | |
| 2009/0265544 A1 | 10/2009 | Moona et al. | |
| 2009/0265552 A1 | 10/2009 | Moshir et al. | |
| 2009/0287589 A1 | 11/2009 | Fivel | |
| 2009/0298540 A1 | 12/2009 | Narendra et al. | |
| 2009/0307139 A1 | 12/2009 | Mardikar et al. | |
| 2009/0307142 A1 | 12/2009 | Mardikar | |
| 2009/0319287 A1 | 12/2009 | Hammad et al. | |
| 2010/0012721 A1 | 1/2010 | Jain et al. | |
| 2010/0023449 A1 | 1/2010 | Skowronek et al. | |
| 2010/0044444 A1 | 2/2010 | Jain et al. | |
| 2010/0045425 A1 | 2/2010 | Chivallier | |
| 2010/0062808 A1 | 3/2010 | Cha et al. | |
| 2010/0063893 A1 | 3/2010 | Townsend | |
| 2010/0181377 A1 | 7/2010 | Chen et al. | |
| 2010/0197224 A1 | 8/2010 | Lahdenniemi et al. | |
| 2010/0203870 A1 | 8/2010 | Hubinak et al. | |
| 2010/0205432 A1 | 8/2010 | Corda et al. | |
| 2010/0213265 A1 | 8/2010 | Narendra et al. | |
| 2010/0258639 A1 | 10/2010 | Florek et al. | |
| 2010/0262503 A1 | 10/2010 | Florek et al. | |
| 2010/0264211 A1 | 10/2010 | Jain et al. | |
| 2010/0274677 A1 | 10/2010 | Florek et al. | |
| 2010/0274726 A1 | 10/2010 | Florek et al. | |
| 2011/0264543 A1 | 10/2011 | Taveau et al. | |
| 2011/0282753 A1 | 11/2011 | Mullen et al. | |

FOREIGN PATENT DOCUMENTS

| | | |
|---|---|---|
| CN | 1835007 | 9/2006 |
| CN | 1870012 | 11/2006 |
| CN | 101013903 | 8/2007 |
| CN | 101136123 | 3/2008 |
| CN | 101329801 | 12/2008 |
| CN | 101339685 | 1/2009 |
| CN | 101351819 | 1/2009 |
| DE | 10130019 A1 | 1/2003 |
| DE | 10 2005 026 435 B3 | 12/2006 |
| DE | 10 2006 019628 | 10/2007 |
| DE | 10 2007 019272 A1 | 10/2007 |
| EP | 0704928 A2 | 4/1996 |
| EP | 601091 B1 | 12/1997 |
| EP | 1365451 A1 | 11/2003 |
| EP | 1450233 A2 | 8/2004 |
| EP | 1536573 | 6/2005 |
| EP | 1729253 | 12/2006 |
| EP | 1752902 A2 | 2/2007 |
| EP | 1752903 A2 | 2/2007 |
| EP | 1785915 A | 5/2007 |
| EP | 1943606 A2 | 7/2008 |
| EP | 2390817 | 11/2011 |
| FR | 0611189 | 9/1926 |
| FR | 0611190 | 9/1926 |
| GB | 2390509 A | 1/2004 |
| GB | 2424151 A | 9/2006 |

(56) References Cited

FOREIGN PATENT DOCUMENTS

| | | | |
|---|---|---|---|
| GB | 2432031 A | 9/2007 | |
| IE | 980562 | 2/2000 | |
| JP | 2003-131808 | 5/2003 | |
| JP | 2004-348235 A | 12/2004 | |
| JP | 2005-284862 A | 10/2005 | |
| JP | 2006-033229 | 2/2006 | |
| JP | 2007034591 * | 2/2007 | ............. G06F 21/24 |
| JP | 2007-060076 A | 3/2007 | |
| JP | 2007-166379 | 6/2007 | |
| JP | 2007-304910 A | 11/2007 | |
| JP | 2008-083867 A | 4/2008 | |
| KR | 2002-0012738 | 2/2002 | |
| KR | 2002-0051696 | 6/2002 | |
| KR | 2002-0073106 | 9/2002 | |
| KR | 2003-0005088 A | 1/2003 | |
| KR | 2004-0012401 A | 2/2004 | |
| KR | 2004-0060249 | 7/2004 | |
| KR | 2004-0089800 A | 10/2004 | |
| KR | 2005-0008622 A | 1/2005 | |
| KR | 2007-0093133 | 9/2007 | |
| SI | 22595 | 2/2009 | |
| WO | WO 03/012717 A1 | 2/2003 | |
| WO | WO 2005/057316 | 6/2005 | |
| WO | WO 2005/086456 | 9/2005 | |
| WO | WO 2006/009460 | 1/2006 | |
| WO | WO 2007/076456 A | 7/2007 | |
| WO | WO 2007/105469 | 9/2007 | |
| WO | WO 2007/136939 | 11/2007 | |
| WO | WO 2008/012416 A2 | 1/2008 | |
| WO | WO 2008/041861 A | 4/2008 | |
| WO | WO 2008/063990 | 5/2008 | |
| WO | WO 2008/105703 A1 | 9/2008 | |
| WO | WO 2009/014502 | 1/2009 | |
| WO | WO 2009/087539 | 7/2009 | |
| WO | WO 2009/118681 | 10/2009 | |
| WO | WO 2010/011670 | 1/2010 | |
| WO | WO 2010/023574 | 3/2010 | |
| WO | WO 2010/032215 | 3/2010 | |
| WO | WO 2010/032216 | 3/2010 | |
| WO | WO 2010/041245 | 4/2010 | |
| WO | WO 2010/044041 | 4/2010 | |
| WO | WO 2010/097777 | 9/2010 | |
| WO | WO 2010/122520 | 10/2010 | |
| WO | WO 2010/128442 | 11/2010 | |
| WO | WO 2010/131226 | 11/2010 | |

OTHER PUBLICATIONS

Wikipedia, "Bluetooth", Wikipedia, The Free Encyclopedia, http://enwikipedia.org/wiki/bluetooth, accessed Apr. 8, 2012, 19 pages.

Wikipedia, "Cellular Frequencies" Wikipedia, The Free Encyclopedia, http://en.wikipedia.org/wiki/cellular_frequencies, accessed Apr. 8, 2012, 5 pages.

"Intelligent Mouse", IBM Technical Disclosure Bulletin, International Business Machines Corp., Thornwood, US, Feb. 1, 1995, 38(2), p. 463.

Finkenzeller (Ed.), "RFID-Handbuch: Grundlagen und praktische Anwendungen Induktiver Funkanlagen, Transponder und kontaktloser Chipkarten", Jan. 1, 2002, 225-231 (English abstract attached).

"EMV Mobile Contactless Payment: Technical Issues and Position Paper", www.emvco.com/mobile.aspx, © Oct. 11, 2007, accessed Apr. 20, 2009, 37 pages.

"NFC Frequently Asked Questions," NFC for Customers, www.nfc-forum.org., Retrieved from the internet on Nov. 7, 2008, 5 pages.

Smart Card Alliance, "RF-Enabled Applications and Technology: Comparing and Contrasting RFID and RF-Enabled Smart Cards", Smart Card Alliance Identity Council, Jan. 2007, 7 pages.

Smart Card Alliance: "Proximity Mobile Payments: Leveraging NFC and the Contactless Financial Payments Infrastructure A Smart Card Alliance Contactless Payments Council White Paper", www.smartcardalliance.org, © Sep. 1, 2007, accessed Nov. 7, 2008, 10 pages.

* cited by examiner

METHOD, CONNECTION AND DATA CARRIER TO PERFORM REPEATED OPERATIONS ON THE KEY-BOARD OF MOBILE COMMUNICATION DEVICE

CROSS-REFERENCE TO RELATED APPLICATIONS

This application is the National Stage of International Application No. PCT/IB2009/051212 filed Mar. 23, 2009, which claims the benefit of Slovak Application No. PP 5030-2008, filed Mar. 25, 2008, the disclosures of which are incorporated herein by reference in their entirety.

FIELD OF INVENTION

The invention relates to a method and a connection to perform repeated sequence of operations on the keyboard of a mobile communication device, principally a mobile phone, at payment applications using a sequence of keyboard orders of a macro type. The invention also concerns a data carrier which is instrumental to protected storage of files with a sequence of keyboard orders according to which the substitution of keystrokes is performed.

PRESENT TECHNOLOGY STATUS

A mobile phone is commonly used for many operations at which the communication is performed via a keyboard. However, keyboard usually consists of multi-purpose cumulative keys for letters and numbers so entering word, rather letter data or orders is time-consuming and difficult.
When using a mobile phone at the payment applications, usually the name, the account number and other data need to be entered. Although these data are entered repeatedly, it would not be safe to store simplifying orders, such as macros in the phone itself.

Many patents, as according to KR20020012738 describe the creation of macro files in a mobile communication device. However, they do not cover the need to protect macro file initiation against unauthorized person. The solution according to patent JP2006033229A allows operating macro files through a voice control but still does not solve the security of data included in macro file in unprotected part of the mobile communication device memory. Likewise, patent according to KR20070093133A describes the way of order initiation, still does not solve the protection of data possibly included in command files. Some solutions, like for example included in U.S. Pat. No. 6,615,243B1 allow separate building of macro file where the macro files are, after their formation, transmitted and performed in the computer itself. Although the creation of macro files is easier, it does not solve the security since these solutions have the only goal and that is to increase the comfort. Similar effect arises by using external, adequate keyboard connected to the mobile communication devise as for patent KR20020051696A.

The invention according to WO2005057316 recognizes the use of RF components while using macro functions but still does not allow file cryptography with the sequence of keyboard orders and so does not solve the security problem according to described demands at the payment operations.

Known are no technical means or methods which would allow a secure realization of repeated sequence of operations on a mobile phone keyboard by means of an external data carrier.

BACKGROUND TO INVENTION

Disadvantages mentioned above are eliminated significantly by the method of realization repeated operations on the keyboard of a mobile communication device, principally a mobile phone, at direct debits using a sequence of keyboard orders of a macro type according to this invention, of which the bottom line is the use of a separate data carrier with a memory on which at least one file with a sequence of keyboard orders is stored. The sequence of keyboard orders is given by the sequence of keystrokes as if it was done by the owner. In order to perform the operation on the keyboard of a mobile communication device, the data carrier and the mobile communication device is connected via a contact-free communication link and the file with a sequence of keyboard orders is sent to the mobile communication device. This operation represents a substitution for pressing the particular keys. The use of separate, detached data carrier of files with a sequence of keyboard orders allows increasing the security of such file. By theft or loss, no risk of information misuse is arisen. Up to the present, separate storage of macro files is not known, in up to now known solutions was the security of macro files realized by protecting the access to macro file itself which was though stored within a device, in which it was or could be realized.

It is advantageous if the file with a sequence of keyboard orders is not saved in memory of the data carrier as access free but it is processed in the data carrier and shows externally in the form of cryptography. By reason of comfortable usage it is suitable if the data carrier gains its energy to process the file from a mobile communication device, favorably contact-free by transformation of electromagnetic field of the mobile communication device.

To reach higher level of security by preserving the same comfort of manipulation it is advantageous to perform the operations on the keyboard of a mobile communication device in such way that a requiring signal is transmitted from a mobile communication device via contact-free communication link into the data carrier approached to the mobile communication device, preferably approached to mobile communication device in the distance less than 10 cm. At this distance is the data carrier energetically supplied contact-free by the electromagnetic field of the mobile communication device. The data carrier receives the requiring order, evaluates it and according to the recognized requiring order chooses from its memory appropriate file with a sequence of keyboard orders. The data carrier encodes this file and subsequently sends to the mobile communication device where the file with a sequence of keyboard orders is decoded and later a process representing keystrokes according to the sequence of keyboard orders are performed. Transmission of the requiring signal is, from the physical point of view, made of electromagnetic field transformed by the data carrier into electric power which energizes the circuits of the data carrier. Due to this, the data carrier receives the requiring order, evaluates it and assesses which of the saved files with a sequence of keyboard orders corresponds with the required order where for example file indexing may be used.

To increase the level of security it is advantageous when the requiring order is encoded before sent from the mobile communication device and the data carrier decodes and subsequently evaluates the requiring order after its receiving.

The mobile communication device and the data carrier can be matched and the data carrier joint in to the communication link firstly recognizes appropriateness of the mobile communication device and/or the mobile communication device recognizes appropriateness of the data carrier. Appropriateness can be recognized due to a unique identifier of the assigned data carrier, possibly the mobile communication device. Such configuration ensures the uniqueness of the communication pair and eliminates situations in which an unsuitable data carrier attempts to communicate with the mobile communication device, for example when trying to transmit and perform undesirable macro files.

For purpose of increasing a higher level of security mainly at the payment transactions, before sending the requiring order, the mobile communication device can ask for entering the correct identifier on the keyboard, preferably PIN code. This proceeding reduces the possibility to send the requiring orders of a stolen mobile communication device, f.e. in aim to break the cryptography.

The file with a sequence of keyboard orders needs to be stored into the memory of the data carrier before its first use. File with a sequence of keyboard orders is into the data carrier stored and/or rewritten via mobile communication device where the transmission is encoded and the mobile communication device includes appropriate software to create the macro files. When recording file with a sequence of keyboard orders the data carrier will be placed near the mobile communication device and transmission of macro file is basically opposite to the transmission and realization of macro file in mobile communication device.

Disadvantages mentioned in the Present Technology Status are eliminated significantly by connection to perform repeated operations on the keyboard of a mobile communication device, principally a mobile phone at direct debits using a sequence of keyboard orders of a macro type by which, the above described method according to this invention is performed and the bottom line of which is that the separate data carrier with memory is connected to the mobile communication device via contact-free communication link. The data carrier also includes a processor, transmitting and receiving unit to communicate with the mobile communication device and a block for transforming electromagnetic field into electric energy. Processor is connected to the memory and also with the transmitting and receiving unit to communicate with the mobile communication device. The components of the data carrier are supplied from the block for transforming electromagnetic field into electric energy. Block of transformation will process the energizing from the electromagnetic field and will mainly be a part of the transmitting and receiving unit of which aerial can be possibly used. The mobile communication device includes a block for processing a file with a sequence of keyboard orders and transmitting and receiving unit for connection into the communication link.

The data carrier is switched to operate by creating electric energy in the block for transforming electromagnetic field of the mobile communication device. Subsequently it can receive and process orders, external data. The data carrier recognizes the appropriateness of the mobile communication device and its received signal decodes, evaluates and reacts by means of choosing the relevant file with a sequence of keyboard orders. To supply energetic need of the data carrier, the data carrier must be located during the operation near the mobile communication device.

In terms of technological compatibility it is advantageous if the mobile communication device is a mobile phone with NFC communication unit.

The subject of this invention is also the data carrier itself, which enables to perform repeated operations on the keyboard of the mobile communication device, mainly a mobile phone at direct debits using the sequence of keyboard orders of a macro type according to this invention, of which the bottom line is that it consists of a processor, transmitting and receiving unit to communicate with the mobile communication device, a block for transforming electromagnetic field into electric energy and a memory to store at least one file of orders. Transmitting and receiving unit and the block for transforming electromagnetic field into electric energy are connected with a processor which is also connected to the memory. Such configuration allows the data carrier, which is approached to the mobile communication device to use the energy of the device and to transform it to electric energy to supply the data carrier components. In advantageous configuration, activated data carrier recognizes the appropriateness of the mobile communication device and receives the requiring order according to which it performs the tasks in the required way.

Utility attributions increase a configuration where the data carrier also contains a component to accumulate electric energy connected with the block for transforming electromagnetic field into electric energy. This component is used for short-term accumulation of electric energy, for energy supply of data carrier circuit during one operation by which is ensured the stabilization of performed processes, also in case of impaired receiving of the electromagnetic field.

It is advantageous if the data carrier includes NFC chip and the data carrier is located in a pendant and/or key ring and/or a sticker and/or a tab.

Invention allows using energetically passive data carrier which is able to process actively, mainly to encode the file with a sequence of keyboard orders of a macro type. The main advantage is a higher security level by preserving user's comfort. This particular energetic passivity enables to reduce the size of the data carrier since no use of own energy source is needed and also user's comfort is increased since the user does not take care of charging or the condition of the data carrier. More macro files can be stored into the data carrier memory.

The components of the data carrier are energetically supplied from electromagnetic field of the mobile communication device either directly by at that time gained energy, or partly by energy accumulated during the state of approach to the mobile communication device at the appropriate macro file transmitting operation.

The invention enables to increase safety and comfort of data entering. At the same time, the invention accelerates the course of the direct debit when the mobile communication device substitutes keystrokes in a set order in a significantly faster mode than the user is able to enter on the keyboard manually.

DESCRIPTION OF DRAWINGS

The invention is described in more details by means of FIGS. 1 and 2, where.

EXAMPLE OF APPLICATION

Figure 1:
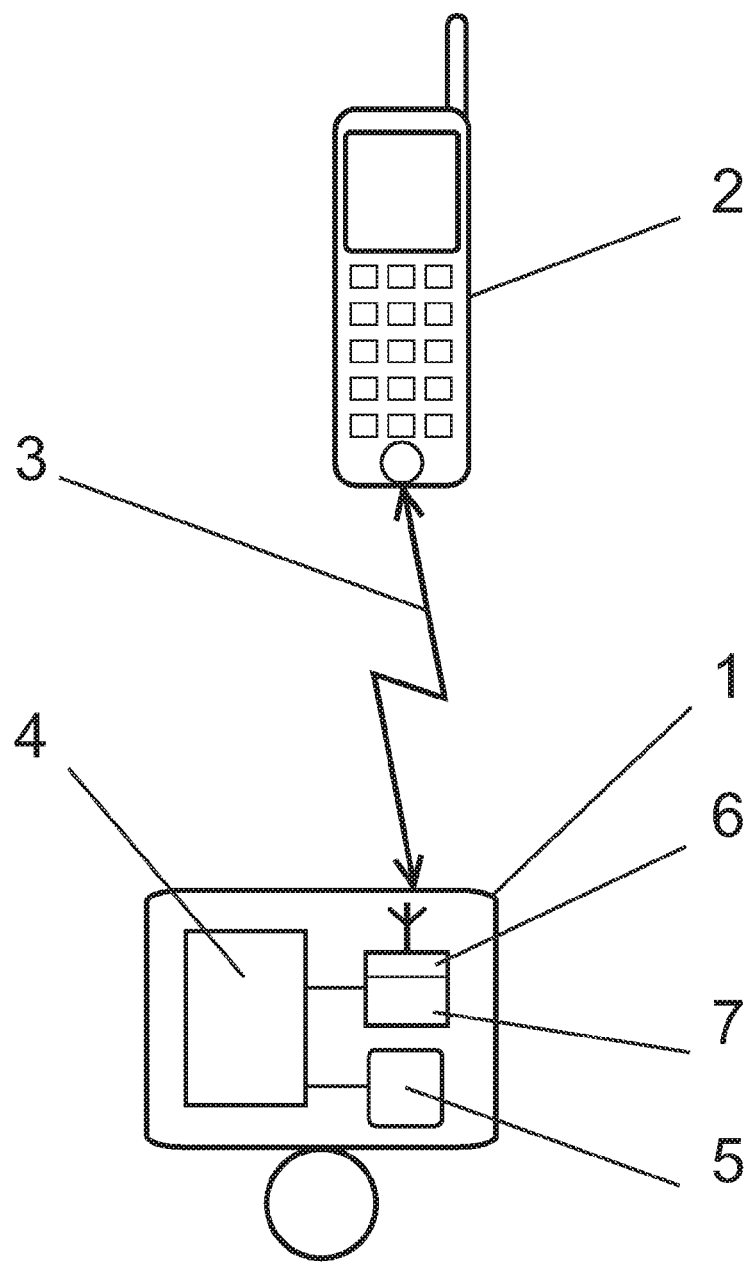
FIG. 1 shows the connection scheme of a mobile communication device and a data carrier at the cashless transaction.
Figure 2:
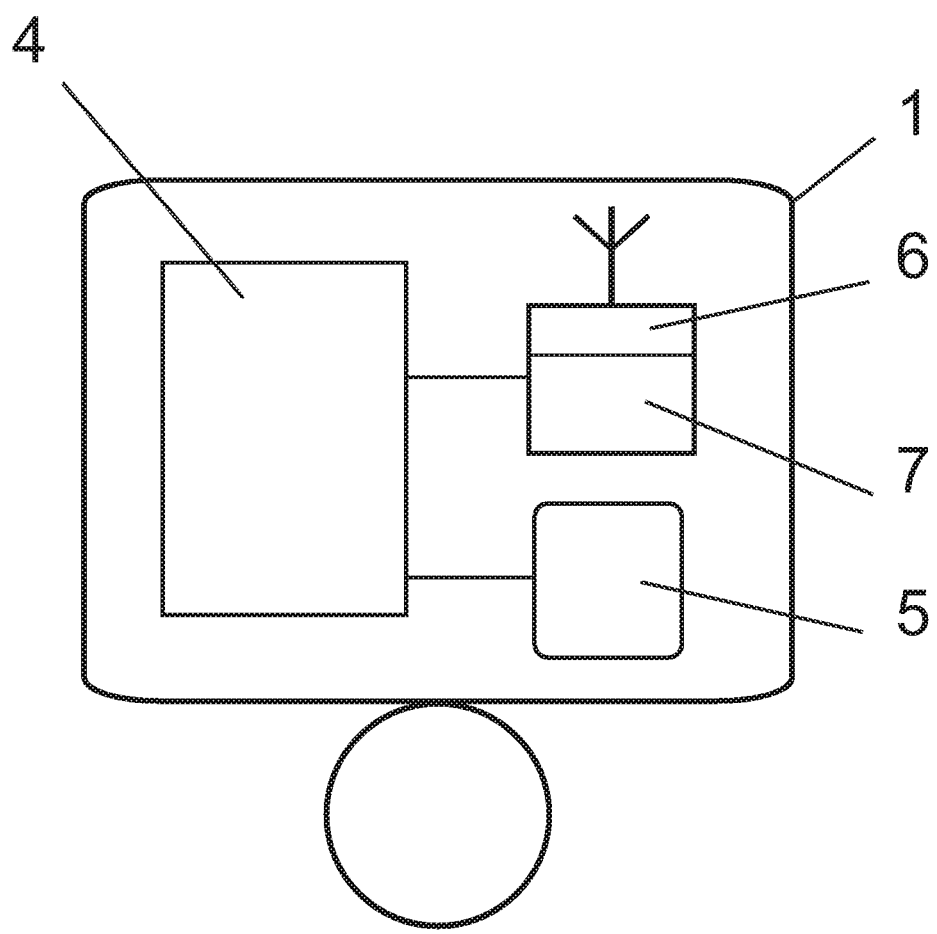
FIG. 2 represents the scheme of data carrier components to store and transmit a file with a sequence of keyboard orders.

In this example the connection consists of a mobile communication device 2 represented by a mobile phone NOKIA 6131 serially equipped by NFC technology and a data carrier 1 located in a key ring.

The mobile communication device 2, in described situation functions similarly as a payment card in such way that in the memory is a software application enabling to realize payments in cooperation with the payment terminal. In the mobile communication device 2 the user, after the application starts has to enter the account number from which at that time activated payment should be realized. The user chooses from the menu of the mobile communication device 2 the selected account. The process of entering the identifying data to the selected account is done in such way, that the user by entering the correct PIN code in the mobile communication device 2 starts a process of requiring a file with sequence of keyboard orders—macro file. Requiring order is encoded and transmitted via transmitting and receiving unit of the mobile communication device 2.

After entering PIN code, the user approaches the key ring which represents the data carrier 1 closer to the mobile communication device 2 by which a contact-free communication link 3 will be made. Electromagnetic field will energize the block 7 for transforming electromagnetic field in the data carrier 1 and the arisen electric energy will supply the components of the data carrier 1. The requesting order is decoded and evaluated in the processor 4 of the data carrier 1. In accordance with the evaluation, the appropriate file with a sequence of keyboard orders which represent the keystrokes in order defining compete identification of the chosen account is selected from the memory 5 placed in data carrier 1. The file with a sequence of keyboard orders will be encoded in data carrier 1. Subsequently, the encoded file is transmitted from data carrier 1 via transmitting and receiving unit 6 into the mobile communication device 2 where it is decoded and used as a common macro file obtained from the keyboard.

Due to its connection, data carrier 1 can also function for payment authenticity and confirmation since from the hardware point of view, it is able to do computing operations which enable encoding and decoding needed for electronic signature realization.

INDUSTRIAL APPLICABILITY

Industrial applicability is obvious. According to this invention, it is possible to enter a sequence of keyboard orders through a separate data carrier with a memory.

According to this invention it is also possible to produce, connect and use passive data carrier, principally by using NFC chip standards where the source, according to this invention, may be supplied by the electromagnetic field of the mobile communication device.

LIST OF RELATED SYMBOLS

1—data carrier
2—mobile communication device
3—communication link
4—processor
5—memory
6—transmitting and receiving unit
7—block of transformation

The invention claimed is:

1. A method for performing an operation associated with a keyboard of a mobile communication device, wherein the operation is performed in connection with a contactless payment via the mobile communication device, the method comprising:
  storing a file with a sequence of key commands in a memory in a data carrier that is physically separate from the mobile communication device;
  locating the data carrier sufficiently near to the mobile communication device to establish a contactless communication channel between the mobile communication device and the data carrier that provides for payment authenticity and payment confirmation;
  transmitting the file with the sequence of key commands and a file account number from which activated payment should be realized via the contactless communication channel from the data carrier into the mobile communication device; and
  performing the operation associated with the keyboard of the mobile communication device in accordance with the sequence of key commands, wherein the mobile communication device and the data carrier are paired and, after establishing the contactless communication channel, the data carrier first recognizes an identity of the mobile communication device before transmitting the file with the sequence of key commands.

2. The method of claim 1,
wherein locating the data carrier sufficiently near to the mobile communication device comprises locating the data carrier with respect to the mobile communication device such that the data carrier is supplied with energy in a contactless manner from an electromagnetic field of the mobile communication device; and further comprising:
  transmitting a request command via the contactless communication channel from the mobile communication device into the data carrier, wherein the data carrier receives the request command and, in accordance with the request command, selects a corresponding file with the sequence of key commands from the memory, encodes the selected file, and transmits the encoded file into the mobile communication device, and wherein the mobile communication device receives the encoded file, decodes the received encoded file, and performs an operation representing keystrokes corresponding to the sequence of key commands.

3. The method of claim 2, wherein the request command is encoded before it is sent from the mobile communication device to the data carrier, and wherein the data carrier receives and decodes the encoded request command.

4. The method of claim 2, wherein the mobile communication device requests entry of an identifier via the keyboard before the request command is transmitted.

5. The method of claim 1, wherein the file with the sequence of key commands is stored and/or rewritten into the data carrier by the mobile communication device.

6. The method of claim 1, wherein the mobile communication device is a mobile phone with a near-field communication element.

7. A system for performing an operation associated with a keyboard of a mobile communication device, wherein the operation is performed in connection with a contactless payment via the mobile communication device, the system comprising:
  a mobile communication device having a keyboard and containing a block for processing a file with a sequence of the key commands; and
  a data carrier physically separate from the mobile communication device and having a memory, a processor, a transmitting and receiving element for communication with the mobile communication device, and a block for transforming an electromagnetic field of the mobile communication device into electrical energy, wherein when the data carrier is located sufficiently near to the mobile communication device a contactless communication channel is established that provides for payment authenticity and payment confirmation, wherein the memory, processor, and transmitting and receiving element of the data carrier are interconnected and supplied with electrical energy from the electromagnetic field of the mobile communication device, and wherein the mobile communication device and the data carrier are paired and, after establishing the contactless communication channel, the data carrier first recognizes an identity of the mobile communication device before transmitting the file with the sequence of key commands and a file account number from which activated payment should be realized.

8. The system of claim 7, wherein the mobile communication device is a mobile phone with a near-field communication element.

9. The system of claim 7, wherein the file with the sequence of key commands is stored in the memory of the data carrier, the data carrier is adapted to transmit the file with the sequence of key commands via the contactless communication channel into the mobile communication device, and the mobile communication device is adapted to perform the operation associated with the keyboard of the mobile communication device in accordance with the sequence of key commands.

10. The system of claim 9, wherein the mobile communication device is adapted to transmit a request command via the contactless communication channel into the data carrier, wherein the data carrier is adapted to receive the request command and, in accordance with the request command, to select a corresponding file with the sequence of key commands from the memory, to encode the selected file, and to transmit the encoded file into the mobile communication device, and wherein the mobile communication device is adapted to receive the encoded file, to decode the received encoded file, and to perform an operation representing keystrokes corresponding to the sequence of key commands.

11. A data carrier for performing an operation associated with a keyboard of a mobile communication device, wherein the operation is performed in connection with a contactless payment via the mobile communication device, the data carrier comprising:
  a transmitting and receiving element for contactless communication with the mobile communication device;
  a block for transforming an electromagnetic field of the mobile communication device into electrical energy, wherein when the data carrier is located sufficiently near to the mobile communication device a contactless communication channel is established that provides for payment authenticity and payment confirmation;
  a memory having stored therein a file containing a sequence of key commands; and
  a processor connected to the block and the memory, wherein the memory, processor, and transmitting and receiving element of the data carrier are interconnected and supplied with electrical energy from an electromagnetic field of the mobile communication device, and wherein the mobile communication device and the data carrier are paired and, after establishing the contactless communication channel, the data carrier first recognizes an identity of the mobile communication device before transmitting the file containing the sequence of key commands and a file account number from which activated payment should be realized.

12. The data carrier of claim 11, further comprising a near-field communication (NFC) chip.

13. The data carrier of claim 11, further comprising a component for electrical energy accumulation connected with the block for transforming an electromagnetic field into electrical energy.

14. The data carrier of claim 11, wherein the data carrier is located in a pendant, key ring, tab, or sticker.

15. The data carrier of claim 11, wherein a file with a sequence of key commands is stored in the memory, and the data carrier is adapted to transmit the file via a contactless communication channel into the mobile communication device.

16. The data carrier of claim 11, wherein the data carrier is adapted to receive a request command via the contactless communication channel from the mobile communication device, and, in accordance with the request command, to select a corresponding file with the sequence of key commands from the memory, to encode the selected file, and to transmit the encoded file into the mobile communication device.

* * * * *